W. A. KÖNEMAN.
VEHICLE TIRE.
APPLICATION FILED JUNE 22, 1908.
928,611.
Patented July 20, 1909.
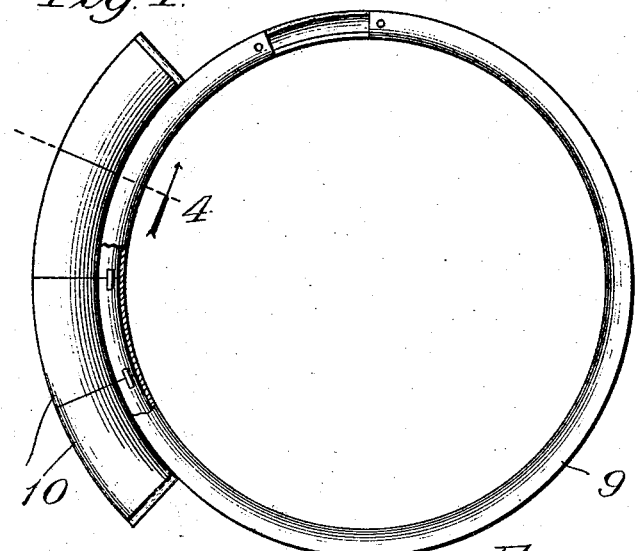
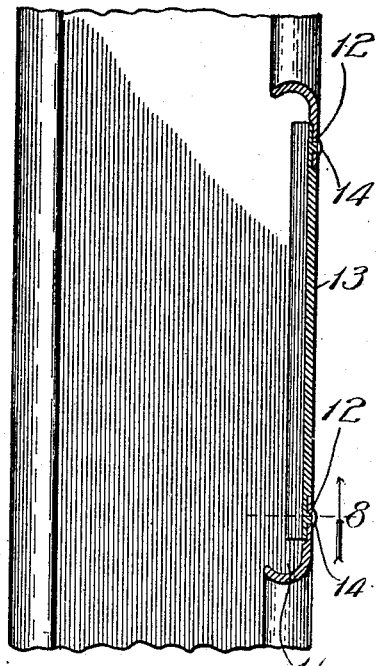
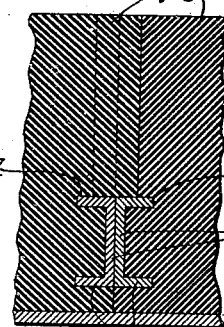
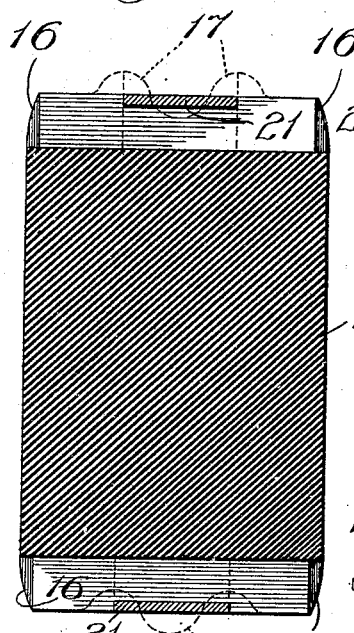
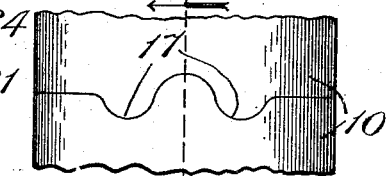
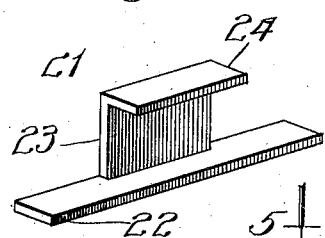
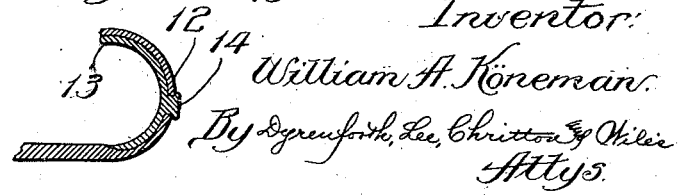

UNITED STATES PATENT OFFICE.

WILLIAM A. KÖNEMAN, OF CUDAHY, WISCONSIN.

VEHICLE-TIRE.

No. 928,611.     Specification of Letters Patent.     Patented July 20, 1909.

Application filed June 22, 1908. Serial No. 439,737.

*To all whom it may concern:*

Be it known that I, WILLIAM A. KÖNE-MAN, a citizen of the United States, residing at Cudahy, in the county of Milwaukee and State of Wisconsin, have invented a new and useful Improvement in Vehicle-Tires, of which the following is a specification.

The object of my invention is to provide a sectional construction of rubber vehicle-tire which shall adapt it to be readily repaired by replacing worn out portions of the tire with new sections, thereby rendering it unnecessary to discard the whole tire when only a portion thereof becomes worn.

In the accompanying drawing, Figure 1 is a broken view in side elevation of a wheel rim adapted for use in embodying my improvement, with a number of the tire-forming sections applied thereto; Fig. 2 is an enlarged broken plan view of the portion of the wheel-rim provided with a removable section; Fig. 3 is a broken plan view of two of the end-abutting and interlocking tire-sections; Fig. 4 is an enlarged section on line 4, Fig. 1, but with the metal locking member omitted; Fig. 5 is an enlarged section on line 5, Fig. 4, with the locking member in place on each end of the tire-section; Fig. 6 is a broken section on line 6, Fig. 3; Fig. 7 is a perspective view of the metal locking member, and Fig. 8 is a broken, enlarged section on line 8, Fig. 2.

The wheel-rim 9 is of the clencher type with a removable and replaceable section to permit introducing upon the rim the similar tire-forming arc-shaped sections 10, of rubber, and the removal from the rim of worn sections. The preferred construction of the removable rim-section is that shown, involving an arc-shaped opening 11, of slightly greater length than that of a section 10, formed in a side of the clencher-rim with the inner face of the rim at each end of said opening cut away and provided with a stud-receiving hole 12, and an arc-shaped rim-section 13 fitting in and filling out this opening 11 to conform to the contour of the rim, with its ends fitting against the said cut-away portions of the inner face of the rim to form therewith lap-joints, and preferably with studs 14 on said ends entering the holes 12 to hold the rim-section removably in place. Each tire section 10 is molded out of rubber or analogous material and vulcanized in the desired shape as to its body-portion, such as that represented, with a base 15 having its ends, by preference slightly beveled to the width of the rim-seat as represented at 16 in Fig. 5, to facilitate introducing it into place on the rim as hereinafter described. The tire-sections may be formed with interlocking means on their ends, shown as ribs 17, which are the preferred form of projections for the purpose; and each tire-section is provided in each end of its base 15, in molding the section, with a transverse groove 18 at the base of a recess 19 terminating at its upper end in a transverse groove 20. A metal locking member 21 conforms to the grooves 18, 20 and interposed recess 19, to enter its base-strip 22 into the groove 18, its neck 23 into the recess and its head-flange 24 into the groove 20. The locking-members 21 are preferably provided in the ends of each tire-section in molding it and vulcanized therein.

To equip a rim 9 with a rubber tire composed of sections 10, the rim-section 13 being removed, a tire-section is introduced at one side of its base transversely of the rim upon the latter through the opening 11. This section is then moved partway about the rim until it clears the opening 11. The reduced ends 16 of the base 15 admit it into and wedge it in the channels forming the sides of the clencher-rim, and the crowding slightly elongates the base and renders it of uniform width throughout under its confinement in the rim. With one section 10 thus applied, another similar section is introduced in the same manner through the opening 11 to abut against the one first introduced, and the ribs 17 on the abutting ends interlock. The tire-section last introduced is then moved about the rim until it clears the opening 11, thereby moving in advance of it the first-inserted section, when a third tire-section is introduced through the rim-opening and locked to the previously introduced section in the manner described; and so on until the last section required to complete the circle about the rim is introduced between the ends of adjacent sections. The length of each tire-section is such as to render the space between the said ends too short to freely admit into it through the rim-opening the aforesaid last section, thereby requiring to permit such admission that the space be widened. This operation is performed, with the aid of any suitable expanding tool, by forcing apart the tire-section flanking said space with the result, required for the well-known wearing purpose, of compressing circumferentially about the rim the tread of the rubber tire. With the space thus widened, the last tire-section may be introduced upon the rim in the manner described of the other sections. Then the rim-section 13 is adjusted into place, and finally the compressed tire-sections are released from the tool when they expand to fill the vacancy left by the withdrawn tool.

To remove a worn tire-section, the sections at the opening 11 are forced apart by the use of the aforesaid tool, when the rim-section 13 is removed, whereupon, on releasing the tool, the tire-sections may be taken out one after the other until the worn one is brought into registration with the opening 11 to be withdrawn and replaced by a new one, and followed by replacement of the other withdrawn sections. The ribs 17 thus interlock the tire-sections against lateral relative displacement. The base-strips 22 interlock with the channels of the rim to prevent radial displacement of the sections, and the flanges 24 on the members 21, by engaging with the rubber in the upper grooves 20, prevent longitudinal tearing of the sections under great torsional strains thereon and tend to obviate binding of the base-strips 22 in the rim.

What I claim as new, and desire to secure by Letters Patent, is—

1. In combination, a vehicle-wheel rim of the clencher-type having an opening, a removable rim-section fitting said opening, a rubber tire formed of arc-shape sections insertible at their bases into and removable from the rim through said opening, and rim-engaging locking-members let into the section-ends and each consisting of a base-strip and a head-flange with a neck connecting them.

2. In combination, a vehicle-rim of the clencher-type having an opening, a removable rim-section fitting said opening, a rubber tire formed of arc-shaped endwise abutting sections insertible at their bases into and removable from the rim through said opening with recesses in the section-ends each consisting of a base-portion, a neck-portion and a head-portion, said sections interlocking at their abutting ends against lateral relative displacement, and rim-engaging locking-members conforming to and let into the recesses in the tire-section ends.

WILLIAM A. KÖNEMAN.

In presence of—
RALPH SCHAEFER,
L. HEISLAR.